United States Patent [19]
Standiford et al.

[11] Patent Number: 5,610,788
[45] Date of Patent: Mar. 11, 1997

[54] MEDIA CONTAINING CARTRIDGE AND DRIVE THEREFOR EMPLOYING MULTIPLE REGISTRATION POINTS

[75] Inventors: Gregory A. Standiford; Kevin L. Miller; Michael P. Eland, all of Loveland; Jon R. Dory, Fort Collins; Devin A. Bloom; Fred O. Stephens, both of Loveland, all of Colo.

[73] Assignee: Hewlett-Packard Company, Palo Alto, Calif.

[21] Appl. No.: 405,340

[22] Filed: Mar. 16, 1995

[51] Int. Cl.$^6$ ............................................. G11B 23/02
[52] U.S. Cl. ............................................. 360/132
[58] Field of Search ............................. 360/132, 94

[56] References Cited

U.S. PATENT DOCUMENTS

| | | | |
|---|---|---|---|
| 3,692,255 | 9/1972 | Von Behren | 242/343.2 |
| 4,262,860 | 4/1981 | Hurtig et al. | 242/343.2 |
| 4,757,399 | 7/1988 | Peterson et al. | 360/132 X |
| 4,803,575 | 2/1989 | Nishimura et al. | 360/94 |
| 4,864,439 | 9/1989 | Duurland | 360/132 X |
| 5,239,436 | 8/1993 | Aizawa et al. | 360/132 |

*Primary Examiner*—John H. Wolff

[57] ABSTRACT

The data storage cartridge drive is designed to securely accommodate and align more than one size cartridge. Reference surfaces are provided for cartridge to drive alignment in a manner so as to enhance stability, particularly during periods when the drive may experience shock or vibration. An additional reference surface is provided to supply added resistance to shock and vibration.

1 Claim, 4 Drawing Sheets

5,610,788

MEDIA CONTAINING CARTRIDGE AND DRIVE THEREFOR EMPLOYING MULTIPLE REGISTRATION POINTS

BACKGROUND OF THE INVENTION

The present invention relates generally to data storage cartridges and drive units for reading data from and writing data to such cartridges.

Data storage cartridges are commonly used for such tasks as safeguarding valuable information stored on computer systems. In performing such a task, a drive unit located either internally or externally to the computer system is used to copy data from the computer system onto a data cartridge. The data storage cartridge may then be stored in a safe location. Should the information on the computer system later become damaged, the data storage cartridge could then be used to retrieve the lost or damaged data.

In addition to the data back-up function described above, data storage cartridges are also often used as primary data storage capacity. Functioning in this manner, data storage cartridges serve as a means for storing computer or other equipment information for later retrieval.

Various types of data storage media are used in data storage cartridges. One common type of media is magnetic tape. In a magnetic tape data storage cartridge, the tape is wound around spools within the cartridge to allow movement of the tape past the read-write head of a cartridge drive unit.

The drive unit, in addition to the read-write head, generally contains a motor for moving the tape or other media, electronics for controlling the drive, and a mechanism for orienting the cartridge within the drive and for securely holding it in place. It is important to proper operation of the drive unit that the data storage cartridge be closely aligned with the drive read/write head while in operation.

One present configuration for achieving this alignment employs a three point contact system between the drive unit and the data storage cartridge. In this configuration, all three points are located on an upwardly facing surface of the cartridge, limiting its upward movement with respect to the drive. Since three points define a plane, this arrangement allows the data storage cartridge to be located fairly precisely with respect to the drive read-write head. It has been found, however, that this three point contact system sometimes causes instability in alignment, particularly when the drive is exposed to vibration or other physical shock while reading from or writing to a data storage cartridge.

As information storage needs have grown, so have the demands placed upon data storage cartridges. In an effort to address these demands, cartridge manufacturers strive for ways to increase the storage capacity of data storage cartridges. Complicating this task, however, is the limitation imposed by the physical size envelope available for cartridges.

Many cartridge drive units are mounted in computers or other electronic devices. This arrangement limits the physical space available for cartridges and the drives that must receive them and thus limits the ultimate physical size attainable for cartridges. When designing new, larger capacity cartridges, manufacturers must, thus, take advantage of existing space.

One such new, larger cartridge has been designed to enable the holding of more media. Unfortunately, the nature of this new design has forced the elimination of one of the previously used contact surfaces in the three point planar contact system.

SUMMARY OF THE INVENTION

The present invention is directed to a cartridge drive system which is able to accurately align data storage cartridges of both the smaller and the larger type. To accomplish this, the reference point eliminated by the larger cartridge design is relocated to a new location on a lower surface of the cartridge baseplate. This new reference point limits downward movement of the cartridge with respect to the drive. In combination with the existing two upward movement limiting reference points, this new reference point defines a plane, thus allowing for precise alignment of the data storage cartridge within the drive. The new location is specifically located so as to provide for improved stability.

In an alternative embodiment of the invention, all of the reference points are located on the bottom surface of the data storage cartridge baseplate in order to provide added stability. The data storage cartridge may, however, also retain the original data points located on the upper surface in order to provide compatibility with standard drive units.

In a another alternative embodiment, the invention comprises a cartridge drive system in which stability and resistance to vibration and shock is increased by adding a fourth strategically positioned reference point. Although three points define a plane, it has been found that a fourth closely toleranced point will provide a form of over-travel protection that limits the amount of movement or rocking that can occur when the drive and cartridge are subjected to vibration or other shock.

DETAILED DESCRIPTION OF THE INVENTION

Figure 1:
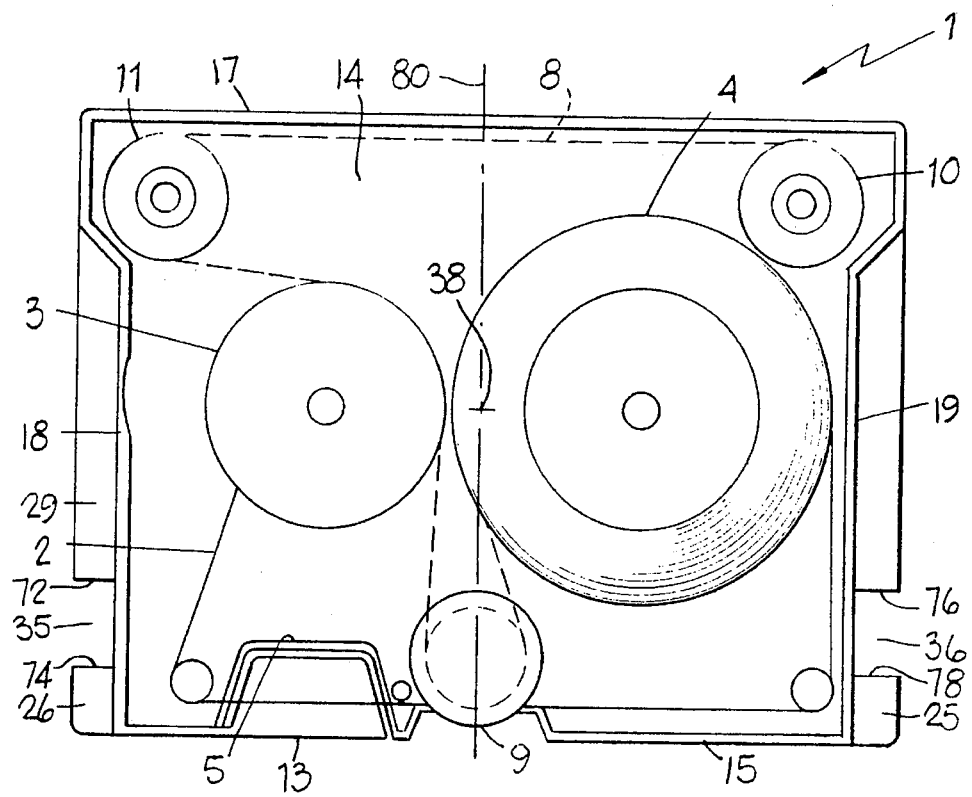
FIG. 1 is a top plan view of a smaller data storage cartridge with its top member removed for clarity.

FIGS. 1–12, in general, illustrate mechanisms for aligning data storage cartridges with drive units that are capable of reading data from and writing data to such cartridges. The alignment mechanisms may include a cartridge 1, 101 with a rigid baseplate 14, 114 having substantially parallel first and second surfaces 61, 62 and an enclosure 70, 170 which houses media 2, 102 contained in the cartridge 1, 101. The enclosure 70, 170 may include a cover member 16, 116 positioned opposite the rigid baseplate 14, 114; a front wall 15, 115 having a media access door 13, 113i located therein; a rear wall 17, 117 opposite the front wall 15, 115; a first side wall 18, 118 extending transversely of the front wall 15, 115; and a second side wall 19, 119 opposite the first side wall 18, 118.

The front wall 15, 115, rear wall 17, 117, first side wall 18, 118 and second side wall 19, 119 serve to connect the cover member 16, 116 to the first surface 61 of the rigid baseplate 14, 114. At least three cartridge reference surfaces 25, 125, 26, 126, 55, 56, 51, 151, 54, 154 are located on the baseplate 14, 114 for contacting corresponding reference surfaces 37, 30, 58, 57, 48, 52 of a cartridge-receiving drive device 39 to cause proper alignment of the media 2, 102 in the cartridge 1, 101 with a media reading head 42 located in the drive device 39. At least one of these cartridge reference surfaces may be located on the second surface 62 of the rigid baseplate 14, 114 at a location that is closer to one of the side walls 18, 118, or 19, 119 than to the other side wall.

The alignment mechanisms may also include a drive device 39 for receiving and reading the media containing cartridge 1, 101. The drive device 39 may include a media reading head 42 located at a rear portion 64 of the drive device 39; a front portion 65 of the drive device 39 that is opposite the rear portion 64; a bottom surface 63 of the drive device 39; a first cartridge guide 40 located on the bottom surface 63 and substantially located between the rear portion 64 and the front portion 65 of the drive device 39; and a second cartridge guide 41 located on the bottom surface 63. The second guide 41 is substantially parallel to the first guide 40 and is substantially located between the rear portion 64 and the front portion 65 of the drive device. At least three drive reference surfaces 37, 30, 58, 57, 48, 52 are provided in the drive device 39 for contacting corresponding reference surfaces 25, 125, 26, 126, 55, 56, 51, 151, 54, 154 of the media containing cartridge 1, 101 to cause proper alignment of the media 2, 102 in the cartridge 1, 101 with the media reading head 42.

At least one of the drive reference surfaces 37, 30, 58, 57, 48, 52 may be located on the bottom surface 63 of the drive device 39 at a location that is closer to the first guide 40 than to the second guide 41.

Having thus described the alignment mechanisms in general, they will now be described in further detail. This description is made with reference to computer data tape cartridges and drives, although the alignment mechanism described can be used with other types of cartridges and drives. For purposes of such description, the "front" of the cartridge is the end of the cartridge proximate front wall 15 which contains tape access opening 5, FIG. 1. This is also the end of the cartridge which is first inserted into the drive unit. The "rear" or "back" of the cartridge is the end of the cartridge opposite the front and which is proximate rear wall 17. The "right" and "left" sides of the cartridge are as viewed from the front of the cartridge and are the sides proximate right wall 19 and left wall 18, respectively. The "top" of the cartridge is the upper portion of the cartridge, as viewed in FIG. 2, which is proximate top member 16. The "bottom" of the drive is the portion of the drive opposite the top and which is proximate baseplate 14.

Figure 4:
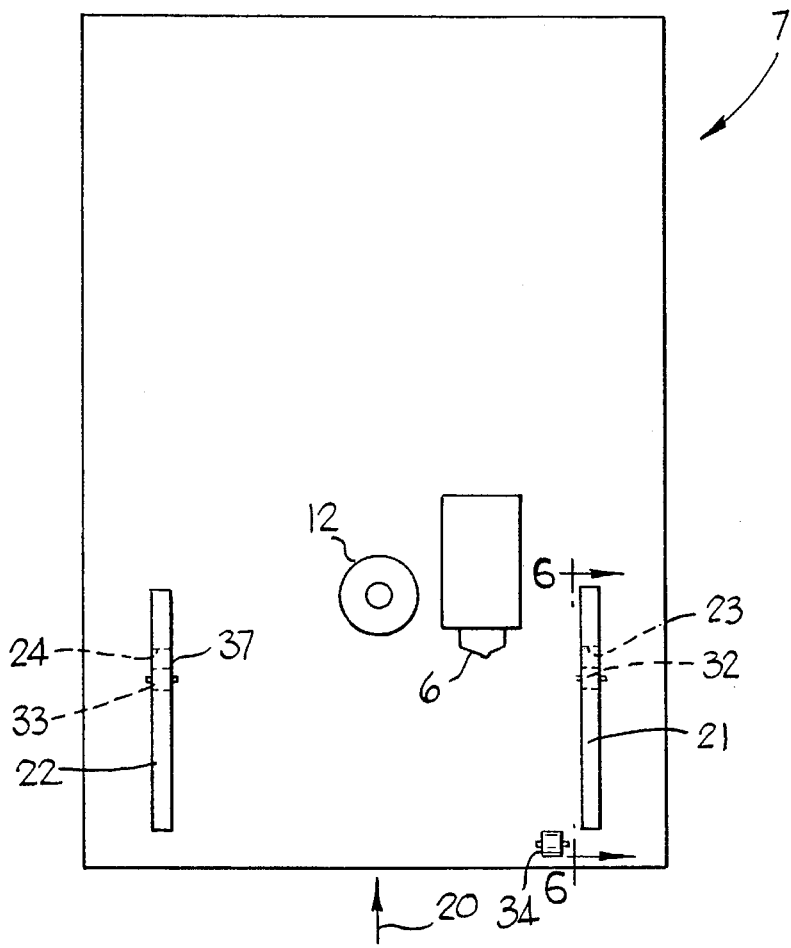
FIG. 4 is a schematic top plan view of a cartridge drive unit with its top removed for clarity.

The "front" of the drive unit is the end containing the user access opening, opposite the end containing read-write head 6 and motor-driven rotating member 12, FIG. 4. The "rear" or "back" of the drive is the end of the drive opposite the front which is proximate read-write head 6 and motor-driven rotating member 12. The "right" and "left" sides of the drive are as viewed from the front of the drive and are the sides proximate right guide 21 and left guide 22, respectively. The "bottom" of the drive is the lower portion of the drive as viewed in FIG. 5. The "top" of the cartridge is the portion of the cartridge opposite the bottom.

The "width" of the drive and the cartridge refers generally to the dimension measured from side to side of the drive and cartridge, respectively. The "length of the drive and the cartridge refers generally to the dimension measured from front to back of the drive and cartridge, respectively.

The above terms are defined for illustration purposes only. In actual use, a cartridge drive unit can be mounted in almost any position, thus making terms such as "top" and "bottom" relative to the orientation of the drive unit.

When a cartridge is inserted into a drive unit, the front of the cartridge aligns with the back of the drive unit, the right side of the cartridge aligns with the left side of the drive unit and the left side of the cartridge aligns with the right side of the drive unit.

FIG. 1 is a top plan view of a data cartridge 1 with its top member 16 removed for clarity. The data storage cartridge 1 contains media, in this case comprising magnetic tape 2. The tape 2 is attached to and stored upon spools 3 and 4.

A drive belt 8 is guided by idlers 10 and 11 and contacts the tape 2 to cause movement of the tape past the access opening 5 and the drive read-write head 6 when the cartridge 1 is inserted into the drive 7. Drive belt 8 is driven by drive pulley 9 which is, in turn, driven by frictional contact with rotating member 12 of the drive 7 when the cartridge 1 is inserted into the drive 7.

An access door 13 is provided to protect the tape when the cartridge is not in use. Access door 13 is designed to open automatically upon insertion of the tape into a drive unit in a manner that is well-known.

Figure 2:
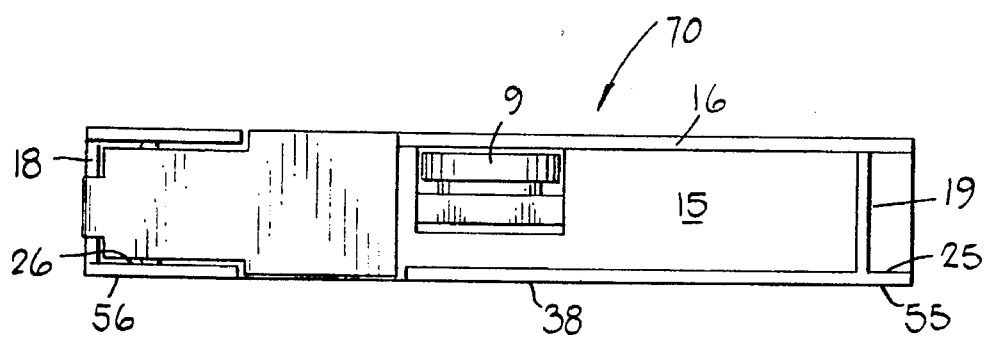
FIG. 2 is a front elevation view of the data storage cartridge of FIG. 1.
Figure 3:
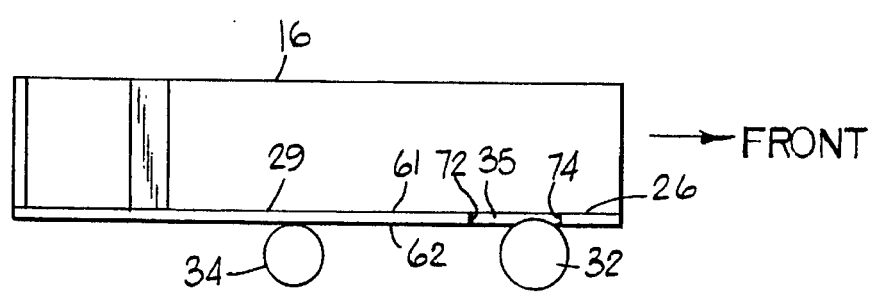
FIG. 3 is a side elevation view of the data storage cartridge of FIG. 1.

FIG. 2 is a front elevational view of cartridge 1. Cartridge 1 has a rigid baseplate 14 usually constructed of a metallic material. Top member 16 is connected to baseplate 14 by front wall 15, rear wall 17, left wall 18 and right wall 19. The top member 16 and the four wall portions are usually constructed as an integral housing which is formed of plastic.

During operation, the cartridge 1 is inserted into drive 7 in the direction shown by arrow 20 (FIG. 4). Guides comprising right guide 21 and left guide 22 serve to guide cartridge 1 into the drive and hold it in place once fully inserted. The portions of the cartridge baseplate 14 extending beyond the walls 17, 18 of cartridge 1 are designed to engage beneath guides 21, 22 as can best be seen from FIG. 5. Stops 23, 24 at the rear end of the guides 21, 22 provide a definite limit of travel for cartridge 1 when inserted.

In order to accomplish the necessary alignment of the cartridge 1 with the drive 7, a three-point contact system is employed. The cartridge 1 has three reference surfaces, all located on the top side of baseplate 14. The right cartridge reference surface 25 and the left cartridge reference surface 26 are both located near the front of baseplate 14, FIG. 1. A rear cartridge reference surface is located on the left side of cartridge 1, toward the rear in the vicinity of reference numeral 29, as shown in FIG. 1. Rear cartridge reference surface 29 may be located in an area extending from about 0.875 inches to about 1.525 inches from the front edge of the baseplate 14 of cartridge 1.

Figure 5:
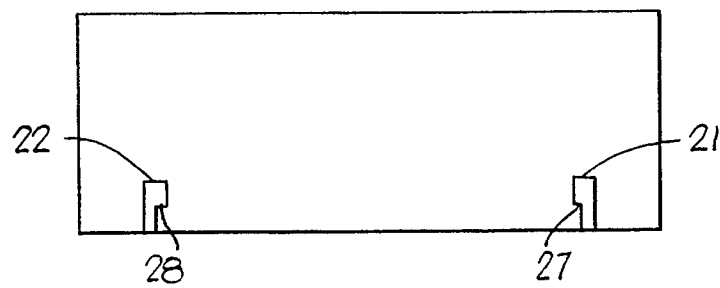
FIG. 5 is a schematic front elevation view of the cartridge drive unit shown in FIG. 4 showing guide structures and with other detail removed.

Drive 7 has three corresponding reference surfaces, two located on the under surface 27 of right guide 21 and one located on the under surface 28 of left guide 22, FIG. 5. When cartridge 1 is inserted into drive 7, these drive reference surfaces become the only limits to upward movement of the cartridge within the drive unit. Since three points define a plane, this three-point contact system defines the orientation of the cartridge within the drive unit, and thus with respect to the read-write head 6.

Figure 6:
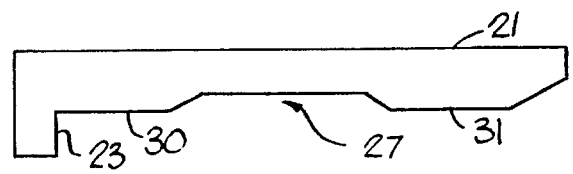
FIG. 6 is a schematic cross sectional view taken on the line 6—6 of FIG. 4.

FIG. 6 is an enlarged view of right guide 21 showing right rear drive reference surface 30 and right front drive reference surface 31. The left rear drive reference surface 37 is similar in detail to right rear reference surface 30, except that it is located on the rear of left guide undersurface 28 as shown in FIG. 4. The drive reference surfaces 30, 31, 37 must be very accurately manufactured so as to force close alignment between the cartridge and the drive read/write head.

When inserted, the cartridge 1 is biased upwardly against drive reference surfaces 30, 31, 37 by rollers 32, 33, 34 which are spring-loaded in a well-known fashion. These rollers are located at or near the locations of the reference surfaces in order to ensure tight contact between cartridge reference surfaces 25, 26, 29 and drive reference surfaces 37, 30, 31 respectively.

The cartridge 1 has a notch 35 defined by edge surfaces 72, 74 and a notch 36 defined by edge surfaces 76, 78. When the cartridge 1 is fully inserted into the drive 7, the rollers 32, 33 engage the edge surfaces 74 and 78 as shown schematically in FIG. 3 with respect to roller 32 and edge 74. The stops 23, 24 of drive 7 prevent the cartridge 1 from moving further forward and this prevents the rollers 32, 33 from entering further into the notches 35, 36. Engagement by the rollers in this manner provides a forward bias to the cartridge so as to force the cartridge against the stops 23 and 24 as well as the upward bias discussed above. Roller 34 provides upward force in the region of drive reference surface 31.

Figure 7:
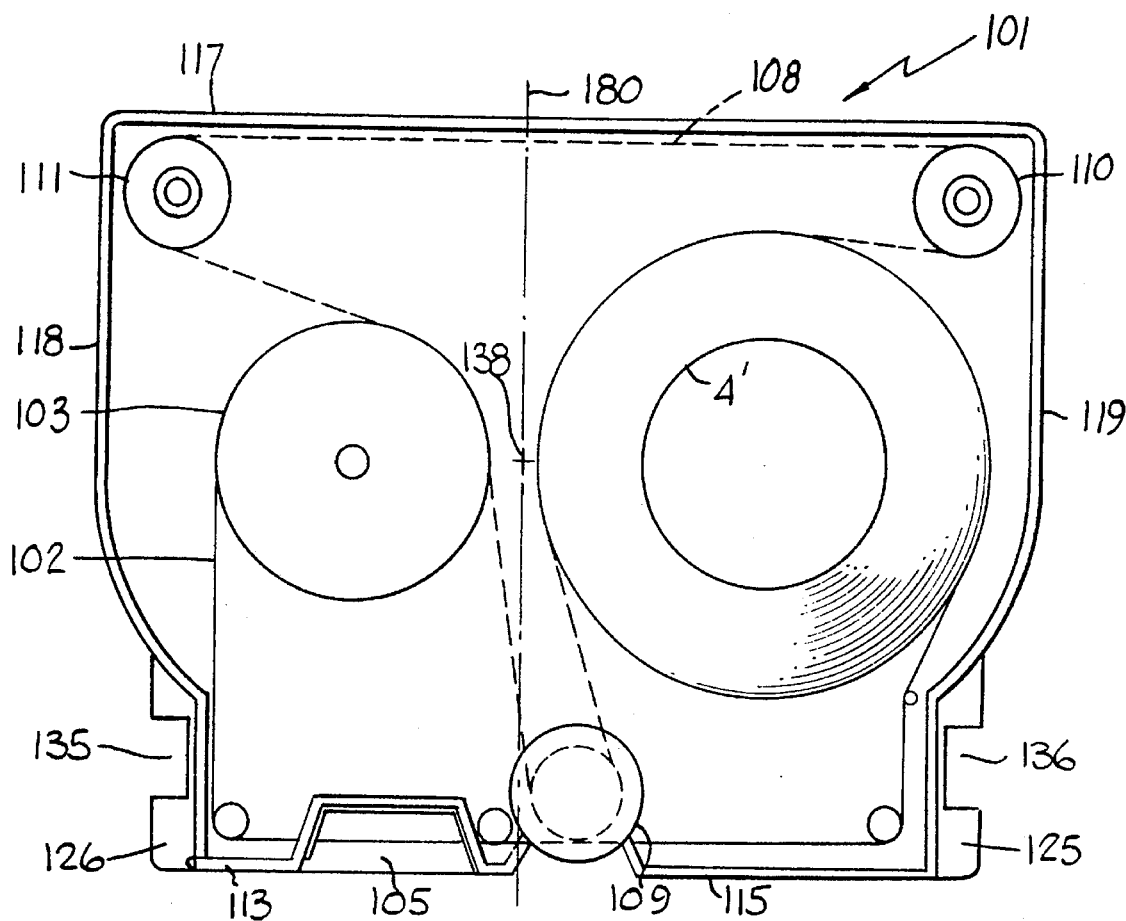
FIG. 7 is a top plan view of a larger data storage cartridge with its top member removed for clarity.

FIG. 7 shows larger data storage cartridge 101 which has increased media capacity over that of the previously described smaller capacity cartridge. The larger cartridge is substantially similar in many aspects to the smaller cartridge. Its configuration near the front of the cartridge is nearly identical to that of the smaller cartridge. As can be seen, however, toward the rear of the cartridge, its physical size has been increased in order to allow the housing of more media than is possible with the smaller cartridge.

FIG. 7 is a top plan view of the larger data cartridge with its top member 116 removed for clarity. The larger data storage cartridge 101 contains media, in this case comprising magnetic tape 102. Tape 102 is attached to and stored upon spools 103 and 104.

A drive belt 108 is guided by idlers 110 and 111 and contacts the tape 102 to cause movement of the tape past the access opening 105 and a drive read-write head when the cartridge 101 is inserted into a drive unit. Drive belt 108 is driven by drive pulley 109 which is, in turn, driven by frictional contact with a motor-driven rotating member in the drive unit. An access door 113 is provided to protect the tape when the cartridge is not inserted into a drive unit.

Figure 8:
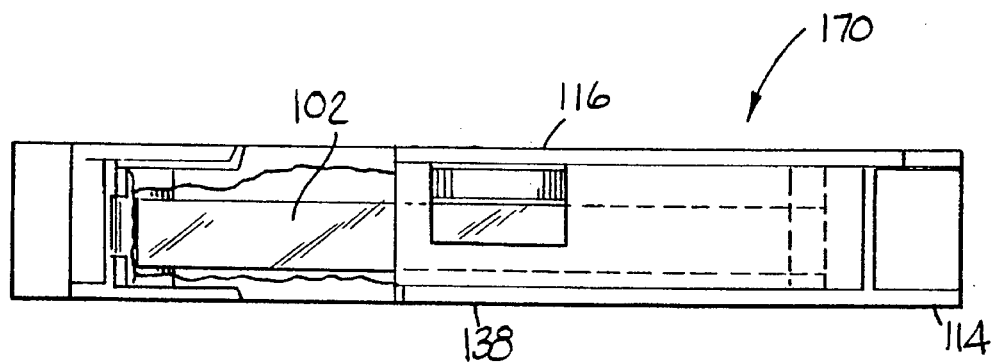
FIG. 8 is a front elevation view of the data storage cartridge of FIG. 7.

FIG. 8 is a front elevational view of cartridge 101 Cartridge 101 has a rigid baseplate 114 usually constructed of a metallic material. Top member 116 is connected to baseplate 114 by front wall 115, rear wall 117, left wall 118 and right wall 119. The top member 116 and the four wall portions are usually constructed as an integral housing which is often formed of plastic.

The baseplate 114 of cartridge 101 has notches 135 and 136. With respect to the tape access opening 5, 105, these notches are located in the same location as the notches 35 and 36 of the smaller cartridge 1. Cartridge 101 also is provided with reference surfaces 125 and 126 which are in the same relative location as the reference surfaces 25 and 26 of cartridge 1.

In this manner, the front of cartridge 101 can be received in a cartridge drive in exactly the same manner as described above with respect to the smaller cartridge 1. As can be seen from FIG. 7, the rear reference surface 29 of cartridge 1, however, is no longer accessible in cartridge 101 due to its larger size.

Because of the larger size of cartridge 101, there is no longer any adequate upper surface of plate 114 upon which to locate a third reference point. Accordingly, it has been proposed to construct a drive unit which allows location of this third point on the bottom of the plate 114 at the location on centerline 80, 180 as shown by reference numeral 38, 138, FIGS. 1 and 7. A drive constructed in this manner would accommodate both smaller and larger cartridges interchangeably. This is a great advantage since it would eliminate the need for a user to purchase a separate drive unit for each type of cartridge.

This location 38 for the third reference surface does not, however, represent an ideal solution. Since the new point 38 is located on the bottom of the plate, the three points 125, 126 and 38 would lie in a plane that is not parallel to the plane of baseplate 114. This lack of parallelism makes such an alignment arrangement more difficult because it requires that the vertical spacing between points 125, 126 and point 38 be closely controlled during manufacture. Such alignment can still, however, be achieved using these three points.

A more serious problem with the location of point 38 is that it lies under an unsupported area of the cartridge. As previously described with respect to the smaller cartridge 1, spring loaded rollers (32, 33, 34, FIG. 4) are employed to hold the cartridge firmly against each reference surface. To accomplish this in the smaller cartridge 1, these rollers forcibly contact the lower side of the baseplate 14 near each reference surface 25, 26, 29.

To hold the larger cartridge 101 firmly against a drive reference surface at the location of point 38, a force would have to be applied by the drive mechanism to an area of the top member 116 of larger cartridge 101 which is also near the location of reference point 38. Because top wall 116 is formed of a relatively non-rigid plastic material, applying a force in this area will result in the deflection of top wall 16, 116 in a downward direction. This deflection may make it difficult to apply enough consistent force to ensure reliable contact between the cartridge reference surface and the corresponding drive reference surface, particularly during periods when the drive may be experiencing vibration or shock. Deflection of top wall 116 may also be great enough to cause interference with the tape 108 and thus impair operation of the data storage system.

As can be seen with reference to both the smaller cartridge 1 (FIG. 1) and the larger cartridge 101 (FIG. 7), the force application area discussed above lies directly over a part of the cartridge that contains the magnetic tape 2, 102 or other media. Accordingly, it is not possible to support top wall 16, 116 in this area.

This problem is addressed by locating the rear reference point at a location near one of the side walls 18, 19, 118, 119 of the data storage cartridge 1, 101. The sidewall provides support for the force application area and prevents any significant deflection of the top wall 16, 116. The cartridge is more rigid in these regions due to proximity to the sidewalls.

Figure 9:
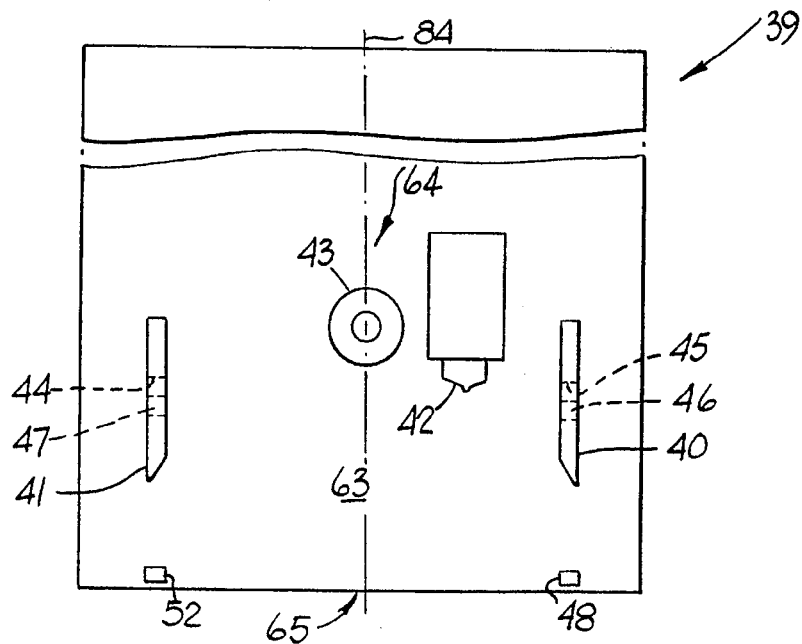
FIG. 9 is a schematic top plan view of a cartridge drive unit with its top member removed for clarity.

FIG. 9 shows a drive unit 39 which is adapted to receive both smaller cartridge 1 and larger cartridge 101 as described below. Guides comprising right guide 40 and left guide 41 guide either cartridge 1 or 101 into the drive and hold it in place once fully inserted. Guides 40 and 41 are similar to the guides 21 and 22 of drive 7, except that guides 40 and 41 are shorter, as shown, to accommodate the configuration of the larger data storage cartridge 101. Guides 40, 41 have stops 44 and 45 which are substantially identical to the stops 23 and 24 of the drive 7.

Drive 39 also contains a read-write head 42 and a driven rotating member 43 which may be substantially identical in construction and operation to the read-write head 6 and the rotating member 12 previously described with respect to the drive 7.

Rear drive reference surfaces, not shown, are provided on guides 40 and 41 for contacting the front cartridge reference surfaces 25, 26 of smaller cartridge 1 and the front cartridge reference surfaces 125, 126 of larger cartridge 101. These reference surfaces are constructed and located in an identical fashion to the rear drive reference surfaces 30, 37 previously described with respect to the drive 7.

Spring loaded rollers 46 and 47 are provided in an identical manner to the rollers 32 and 33 of drive 7 in order to supply upward force to the bottom of both the baseplate 14 of smaller cartridge 1 and the baseplate 114 of larger cartridge 101. As in drive 7, these spring loaded rollers serve to hold the cartridge reference surfaces 25, 125 and 26, 126 in tight contact with the drive rear reference surfaces located on guides 41 and 40.

The third reference surface 48 is provided at the front of drive 39 as shown. This reference surface is located to coincide as closely as possible with the plane of side walls 18 and 118 of both the smaller cartridge 1 and the larger cartridge 101. Reference surface 48 may have a width of about 0.15 inches and may be located in an area extending from about 1.41 inches to about 1.56 inches from drive centerline 84 with its center located at about 1.49 inches from drive centerline 84. Drive centerline 84 is centered between the right and left guides 40, 41. As discussed previously, this location for reference surface 48 allows downward force to be applied to top member 16, 116 of the cartridge 1, 101 at a location close to one of the sidewalls, where the cartridge exhibits more rigidity.

Figure 10:
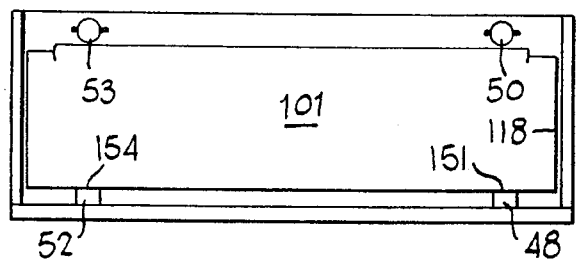
FIG. 10 is a schematic front elevation view of the cartridge drive unit shown in FIG. 9 with a larger cartridge inserted.

FIG. 10 schematically shows larger cartridge 101 inserted into the drive unit 39 as viewed from the rear of the cartridge (the front of the drive). Third drive reference surface 48 provides a downward limit of travel for the rear of cartridge 101. The corresponding force-applying roller 50 applies a downward force to hold reference point 151 of cartridge 101 tightly against reference surface 48 to ensure proper registration. As can be seen from FIG. 10, the location of reference surface 48 allows roller 50 to engage the cartridge 101 at a location near sidewall 118, thus providing for the rigidity discussed above.

The width, from sidewall 118 to sidewall 119, of larger cartridge 101 measured at the location of reference surfaces 151 and 154 may be about 3.63 inches. Each sidewall 118, 119 is, thus, located approximately 1.82 inches from the centerline 180 of cartridge 101 at this location. When inserted into the drive 39, the centerline 180 of cartridge 101 lies directly over the centerline 84 of drive 39. Accordingly, cartridge reference surface 151 may be located the same distance (approximately 1.82 inches) from centerline 180 as the drive reference surface 48 is from drive centerline 84 as previously described. This configuration results in the center of larger cartridge 101 reference surface 151 being located within about 0.33 inches of the plane of sidewall 118.

Figure 11:
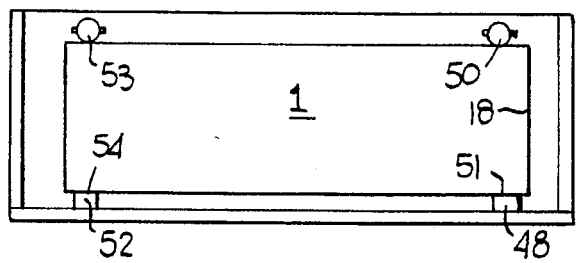
FIG. 11 is a schematic front elevation view of the cartridge drive unit shown in FIG. 9 with a smaller cartridge inserted.

Roller 50 and reference surface 48 do not contact larger cartridge 101 directly in the plane of sidewall 118 due to the fact that roller 50 and reference surface 48 must also be able to also contact the smaller cartridge 1. FIG. 11 schematically shows smaller cartridge 1 inserted into the drive unit 39 as viewed from the rear of the cartridge (the front of the drive). As can be seen, with the smaller cartridge 1 inserted, the roller 50 and reference surface 48 contact the smaller cartridge 1 substantially in the plane of sidewall 18.

The width, from sidewall 18 to sidewall 19, of smaller cartridge 1 measured at the location of reference surfaces 51 and 54 may be about 2.81 inches. Each sidewall 18, 19 is, thus, located approximately 1.41 inches from the centerline 80 of cartridge 1 at this location. When inserted into the drive 39, the centerline 80 of cartridge 1 lies directly over the centerline 84 of drive 39. Accordingly, cartridge reference surface 51 may be located the same distance (approximately 1.41 inches) from centerline 80 as the drive reference surface 48 is from drive centerline 84 as previously described. This configuration results in the center of smaller cartridge 1 reference surface 51 being located within about 0.08 inches of the plane of sidewall 18.

The third drive reference surface may, alternatively, be located near cartridge side wall 19, 119 as illustrated by reference surface 52. Reference surface 52 may have a width of about 0.15 inches and may be located in an area extending from about 1.41 inches to about 1.56 inches from drive centerline 84 with its center located at about 1.49 inches from drive centerline 84. Corresponding cartridge reference surfaces 54, 154 may be provided to contact drive reference surface 52. Roller 53 provides the downward force to ensure reliable contact between the reference surfaces in a manner as previously described. The roller 53, drive reference surface 52, and cartridge reference surface 54, 154 may be located the same distance from centerlines 80, 180 and 84 as the roller 50, drive reference surface 48, and cartridge reference surface 51, 151, as described previously.

The location of the third reference surface 48 or 52 as described thus provides for a stable three-point registration system that can accommodate both smaller data storage cartridges and larger data storage cartridges.

According to an alternative embodiment of the invention, a fourth reference surface may be added for improved stability and resistance to vibration and shock experienced by the cartridge to drive registration system. Although three points define a plane, it has been found that a fourth closely toleranced point located substantially in the same plane as the other three points will provide a form of over-travel protection that limits the amount of movement or rocking that can occur when the drive and cartridge are subjected to vibration or other shock.

Referring again to FIGS. 10 and 11, both tape drive reference surfaces 48 and 52 may be provided for supporting the cartridges 1, 101. Corresponding rollers 50 and 53 may also be provided, applying a downward force to bias cartridge 1, 101 toward the reference surfaces 48 and 52. Cartridges 1 and 101 are also provided with both reference surfaces 51, 151 and 54, 154, respectively to correspond to the drive reference surfaces 48 and 52.

During normal operation, the cartridge will always ride on three of the four reference surfaces. During periods of vibration or shock, however, the cartridge can rock or tilt off of one of these surfaces. The fourth reference surface provides a stabilizing over-travel limit in such situations, thus improving the stability of the cartridge and drive system.

Figure 12:
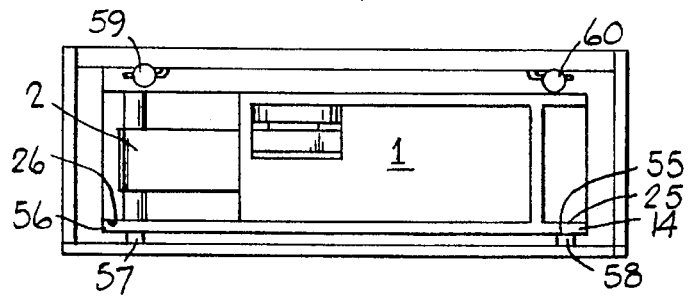
FIG. 12 is a schematic front elevation view of a cartridge inserted into a drive unit.

According to another alternative embodiment of the invention, a data storage cartridge may be provided with all of its reference surfaces located on the bottom surface of the rigid baseplate. FIG. 12 schematically shows smaller cartridge 1, viewed from the front of the cartridge (the rear of the drive), inserted into a drive according to this embodiment. The previously described cartridge reference surfaces 25 and 26 may be moved from the top of baseplate 14 to corresponding positions 55, 56 on the lower side of baseplate 14 as shown. A drive adapted to receive such a cartridge may be provided with a right rear drive reference surface 57 and a left rear drive reference surface 58 located on the bottom of the drive unit in a manner and lateral location similar to that described with respect to drive front reference surfaces 48 and 52 above. The drive reference surfaces 57 and 58 are adapted to contact cartridge reference surfaces 56 and 55, respectively to accomplish proper alignment as previously described. The rear drive reference surfaces 57 and 58 described above may be located in the area of rollers 46 and 47 which are no longer needed.

Spring loaded rollers 60 and 59 are located so as to provide downward force on the cartridge 1 and hold the cartridge reference surfaces 55 and 56 tightly against tape drive reference surfaces 58 and 57, respectively. Locating all of the reference surfaces on the bottom of the baseplate obviates the problem discussed above regarding having the three reference points in a plane that is not parallel to the baseplate itself.

Of course, cartridge reference surfaces 125 and 126 of the larger cartridge 101 may also be located at corresponding positions on the lower side of the baseplate 114 of cartridge 101. A drive constructed as described above would, thus, accommodate both smaller and larger cartridges having all of the reference surfaces located on the bottom of the cartridge. This embodiment could also be employed with either three or four reference surfaces located on the bottom of the baseplate 14, 114. To use three reference surfaces, only one of the drive front reference surfaces 48, 52 (FIG. 10) might be provided. Alternatively, to use four reference surfaces, both reference surfaces 48, 52 might be provided.

As a further alternative, if only three reference surfaces are desired, then one of the drive front reference surfaces 48, 52 could be provided along with a combination of two of the previously described drive rear reference surfaces 31, 37, 48 and 52.

In another alternative embodiment of the invention, the cartridge 1, 101 could be provided with all four previously described front cartridge reference surfaces 25, 26, 55 and 56 (125, 126, 155 and 156 with respect to cartridge 101). This configuration results in reference surfaces being located on both the top and the bottom of the front of baseplate 14, 114, as well at a rear location or locations such as 51, 151 and 54, 154. Use of only one of these rear points would result in a cartridge having five reference surfaces, whereas using both would result in a cartridge having a total of six reference surfaces.

A data storage cartridge constructed in this manner could be used in a drive configuration having top reference surfaces in the rear and a bottom reference surface or surfaces at the front as described with respect to FIGS. 10 and 11. Such a data storage cartridge could also, however, be used in a drive having all of its reference surfaces on the bottom as described with respect to FIG. 12.

It should be noted that adding reference points to the baseplate of a cartridge requires that close tolerances be held in the applicable areas of the baseplate. Although cartridge reference points located on the baseplate cannot generally be seen with the naked eye, they do, nevertheless represent defined areas of closely specified tolerance.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A cartridge containing a data storage medium, the cartridge comprising:

a rigid baseplate having a first surface facing an interior of the cartridge, a second surface opposite the first surface, a front edge, and a side edge transverse to the front edge;

a first reference surface on the first surface of the baseplate near the front edge and near the side edge, the first reference surface suitable for contact with a matching reference surface in a drive; and a second reference surface on the second surface of the baseplate near the side edge and substantially displaced from the front edge, the second reference surface suitable for contact with a matching reference surface in a drive.

* * * * *